United States Patent
Kanazawa et al.

(10) Patent No.: US 12,004,915 B2
(45) Date of Patent: Jun. 11, 2024

(54) METHOD OF MANUFACTURING REMOVABLE DENTURE, REMOVABLE DENTURE, AND REMOVABLE DENTURE MANUFACTURING APPARATUS

(71) Applicant: National University Corporation Tokyo Medical and Dental University, Tokyo (JP)

(72) Inventors: Manabu Kanazawa, Toyko (JP); Yumika Soeda, Toyko (JP); Maiko Iwaki, Toyko (JP); Toshio Arakida, Toyko (JP); Tamaki Hada, Toyko (JP); Shunsuke Minakuchi, Toyko (JP)

(73) Assignee: National University Corporation Tokyo Medical and Dental University, Tokyo (JP)

( * ) Notice: Subject to any disclaimer, the term of this patent is extended or adjusted under 35 U.S.C. 154(b) by 751 days.

(21) Appl. No.: 17/043,048

(22) PCT Filed: Mar. 28, 2019

(86) PCT No.: PCT/JP2019/013775
§ 371 (c)(1),
(2) Date: Sep. 29, 2020

(87) PCT Pub. No.: WO2019/189649
PCT Pub. Date: Oct. 3, 2019

(65) Prior Publication Data
US 2021/0015592 A1    Jan. 21, 2021

(30) Foreign Application Priority Data

Mar. 29, 2018 (JP) .................................. 2018-065256

(51) Int. Cl.
*A61C 13/36* (2006.01)
*A61C 13/00* (2006.01)
(Continued)

(52) U.S. Cl.
CPC ...... *A61C 13/1016* (2013.01); *A61C 13/0004* (2013.01); *A61C 13/0019* (2013.01);
(Continued)

(58) Field of Classification Search
CPC ............ A61C 13/1016; A61C 13/0004; A61C 13/0019; A61C 13/04; A61C 13/34;
(Continued)

(56) References Cited

U.S. PATENT DOCUMENTS

2014/0272787 A1   9/2014   Ginsburg et al.
2014/0317930 A1   10/2014  Klingenburg et al.
(Continued)

FOREIGN PATENT DOCUMENTS

DE    102011118320    5/2013
JP    2013-512695     4/2013
(Continued)

OTHER PUBLICATIONS

International Preliminary Report on Patentability dated Jun. 5, 2020 From the International Bureau of WIPO Re. Application No. PCT/JP2019/013775. (16 Pages).
(Continued)

*Primary Examiner* — Thomas C Lee
*Assistant Examiner* — Ameir Myers (57) ABSTRACT

Removable denture data of a removable denture is produced, and disk frame data of a disk frame in which the removable denture is accommodated is produced, thereby building the disk frame based on the disk frame data. Next, a resin disk in which artificial teeth are embedded is produced by arranging the artificial teeth in the disk frame and curing a base resin, and a denture base is milled by milling the resin disk based on the removable denture data, thereby manufacturing the removable denture in which a base side of the artificial teeth is embedded in the denture base. As a result,
(Continued)

artificial teeth having an excellent aesthetics may be used, it is possible to firmly join the artificial teeth and the denture base to each other, and it is possible to manufacture a removable denture with a favorable restoration accuracy of the artificial teeth.

9 Claims, 7 Drawing Sheets (51) Int. Cl.
*A61C 13/01* (2006.01)
*A61C 13/34* (2006.01)
*B29C 65/00* (2006.01)
*B33Y 10/00* (2015.01)
*B33Y 50/02* (2015.01)
*B33Y 80/00* (2015.01)

(52) U.S. Cl.
CPC .............. *A61C 13/04* (2013.01); *A61C 13/34* (2013.01); *B29C 66/032* (2013.01); *B33Y 10/00* (2014.12); *B33Y 50/02* (2014.12); *B33Y 80/00* (2014.12)

(58) Field of Classification Search
CPC ......... B33Y 10/00; B33Y 50/02; B33Y 80/00; B29C 66/032
See application file for complete search history.

(56) References Cited

U.S. PATENT DOCUMENTS

| 2015/0245891 | A1 | 9/2015 | Grobbee | |
|---|---|---|---|---|
| 2015/0342711 | A1 | 12/2015 | Grobbee | |
| 2018/0042708 | A1* | 2/2018 | Caron | ................ A61C 13/2255 |
| 2019/0090995 | A1* | 3/2019 | Ruppert | ................ B33Y 30/00 |

FOREIGN PATENT DOCUMENTS

| JP | 2014-500749 | 1/2014 |
|---|---|---|
| JP | 2016-517308 | 9/2016 |
| JP | 2018-500071 | 1/2018 |
| WO | WO 2019/189649 | 10/2019 |

OTHER PUBLICATIONS

International Search Report and the Written Opinion dated Jun. 11, 2019 From the International Searching Authority Re. Application No. PCT/IP2019/013775 and Its Translation of Search Report Into English. (8 Pages).

Written Opinion dated Apr. 14, 2020 From the International Preliminary Examining Authority Re. Application No. PCT/JP2019/013775. (6 Pages).

Supplementary European Search Report and the European Search Opinion dated Apr. 23, 2021 From the European Patent Office Re. Application No. 19777932.5. (7 Pages).

* cited by examiner

METHOD OF MANUFACTURING REMOVABLE DENTURE, REMOVABLE DENTURE, AND REMOVABLE DENTURE MANUFACTURING APPARATUS

RELATED APPLICATIONS

This application is a National Phase of PCT Patent Application No. PCT/JP2019/013775 having International filing date of Mar. 28, 2019, which claims the benefit of priority of Japanese Patent Application No. 2018-065256 filed on Mar. 29, 2018. The contents of the above applications are all incorporated by reference as if fully set forth herein in their entirety.

FIELD AND BACKGROUND OF THE INVENTION

The present invention relates to a method of manufacturing a removable denture in which artificial teeth are arranged on a denture base, the removable denture, and a removable denture manufacturing apparatus.

Dental prostheses in the oral cavity include removable dentures such as partial dentures and full dentures. A removable denture is a denture in which one artificial tooth or a plurality of artificial teeth are arranged on a denture base as a base. The removable denture is installed in a manner in which a mucosa-facing surface of the denture base is closely attached to a gingival mucosal surface in the oral cavity.

In recent years, with improvement in milling technology and building technology, highly accurate milling or building has become possible. In this regard, various methods of manufacturing artificial teeth or denture bases using a computer aided design (CAD)/computer aided manufacturing (CAM) technology to manufacture a removable denture have been proposed.

For example, Japanese National-Phase Publication (JP-A) No. 2013-512695 proposes a method of acquiring digital data of a denture to manufacture a removable denture based on the acquired digital data. In the technology disclosed in JP-A No. 2013-512695, digital data is separated into dental arch model data and denture base model data, and a milling or building technology is used to manufacture a dental arch integrated with a plurality of artificial teeth based on the dental arch model data, and to manufacture a denture base based on the denture base model data. It is proposed to then obtain a removable denture by bonding or joining the manufactured dental arch and the manufactured denture base to each other.

SUMMARY OF THE INVENTION

Technical Problem

A removable denture to be installed in the oral cavity is required to have accuracy in matching with a mucosal surface and reproducibility of an occlusal relationship. In particular, in a case where the reproducibility of the occlusal relationship is reduced, the removable denture does not function effectively in the oral cavity. With the conventional method of manufacturing a removable denture by using the CAD/CAM technology, favorable matching with a mucosal surface can be obtained. However, in a case of manufacturing artificial teeth and a denture base and joining the manufactured artificial teeth to the denture base as in a technology of Patent Document 1, it is not possible to obtain accuracy (restoration accuracy of the artificial tooth) in correctly joining the artificial teeth to predetermined positions according to digital data of the denture, and it is not possible to obtain reproducibility of an occlusal relationship, which is problematic. Further, a dental arch as in the technology of Patent Document 1 has a problem that an aesthetics of individual artificial teeth deteriorates (the aesthetics cannot be obtained). In addition, there is a problem that it is difficult to firmly join the artificial teeth and the denture base that are individually manufactured.

The present invention has been made in view of the above facts, and an object of the invention is to provide a method of manufacturing a removable denture, in which artificial teeth and a denture base can be firmly joined to each other, a removable denture, and a removable denture manufacturing apparatus.

Solution to Problem

A method of manufacturing a removable denture according to an aspect of the present invention includes: a data producing step of producing three-dimensional removable denture data for a removable denture to be manufactured, by producing three-dimensional denture base data of a denture base, and three-dimensional artificial teeth data including artificial teeth arranged on the denture base, and arrangement of the artificial teeth; a block producing step of producing a resin block by arranging the artificial teeth in a frame body based on the artificial teeth data, and filling a base resin for forming the denture base into the frame body in which the artificial teeth are arranged; and a milling step of milling the removable denture in which the artificial teeth are arranged on the denture base, by milling, based on the removable denture data, the resin block using a milling device.

A removable denture according to an aspect of the invention is manufactured by a method of manufacturing a removable denture, the method including: a data producing step of producing three-dimensional removable denture data for a removable denture to be manufactured, by producing three-dimensional denture base data of a denture base, and three-dimensional artificial teeth data including artificial teeth arranged on the denture base, and arrangement of the artificial teeth; a block producing step of producing a resin block by arranging the artificial teeth in a frame body based on the artificial teeth data, and filling a base resin for forming the denture base into the frame body in which the artificial teeth are arranged; and a milling step of milling the removable denture in which the artificial teeth are arranged on the denture base, by cutting, based on the removable denture data, the resin block using a milling device.

A removable denture manufacturing apparatus according to an aspect of the invention includes: a designing unit that produces three-dimensional removable denture data for a removable denture to be manufactured, by producing three-dimensional denture base data of a denture base, and three-dimensional artificial teeth data including artificial teeth arranged on the denture base, and arrangement of the artificial teeth; a milling device that performs milling on a resin block obtained by arranging the artificial teeth in a frame body based on the artificial teeth data, and filling a base resin for forming the denture base into the frame body in which the artificial teeth are arranged; and a control unit that controls the milling device to mill, based on the removable denture data, the resin block, thereby milling the removable denture in which the artificial teeth are arranged on the denture base.

Advantageous Effects of Invention

As described above, according to the aspects of the present invention, an effect that enables manufacturing of a removable denture in which artificial teeth and a denture base are firmly joined to each other is obtained. Moreover, according to the aspects of the invention, it is possible to use artificial teeth having a favorable restoration accuracy and an excellent aesthetics, and thus it is possible to manufacture a high-quality removable denture.

DESCRIPTION OF SPECIFIC EMBODIMENTS OF THE INVENTION

The present embodiment includes the following aspects.

<1> A method of manufacturing a removable denture including: a data producing step of producing three-dimensional removable denture data for a removable denture to be manufactured, by producing three-dimensional denture base data of a denture base, and three-dimensional artificial teeth data including artificial teeth arranged on the denture base, and arrangement of the artificial teeth; a block producing step of producing a resin block by arranging the artificial teeth in a frame body based on the artificial teeth data, and filling a base resin for forming the denture base into the frame body in which the artificial teeth are arranged; and a milling step of milling the removable denture in which the artificial teeth are arranged on the denture base, by milling, based on the removable denture data, the resin block using a milling device.

<2> The method of manufacturing a removable denture according to <1>, wherein the milling step includes milling the artificial teeth based on the artificial teeth data.

<3> The method of manufacturing a removable denture according to <1> or <2>, wherein the artificial teeth are positioned with respect to the frame body based on the artificial teeth data and are arranged on a bottom plate in the frame body.

<4> The method of manufacturing a removable denture according to any one of <1> to <3>, wherein fitting portions into which base side portions of the artificial teeth that are opposite to occlusal surface side portions or occlusal surfaces of the artificial teeth are fitted in a case where the artificial teeth are arranged based on the artificial teeth data are provided in the bottom plate in the frame body.

<5> The method of manufacturing a removable denture according to any one of <1> to <4>, wherein a positioning portion by which the artificial teeth arranged in the frame body are positioned with respect to the milling device is provided on the frame body.

<6> The method of manufacturing a removable denture according to any one of <1> to <5>, further including a building step of building the frame body based on three-dimensional frame body data of the frame body by using a building device, wherein the frame body data is produced according to the removable denture data.

<7> The method of manufacturing a removable denture according to <6>, wherein the frame body data is produced by determining relative positions so that a removable denture image represented by the removable denture data is accommodated in a frame body image represented by the frame body data.

<8> The method of manufacturing a removable denture according to <7>, further including a step of producing the frame body data so that, as the base side portions of the artificial teeth of the removable denture image that are opposite to the occlusal surface side portions or occlusal surfaces are overlapped with the bottom plate of the frame body image, the overlapped portions are removed from the bottom plate of the frame body image.

<9> A removable denture manufactured by the method of manufacturing a removable denture according to any one of <1> to <8>.

<10> A removable denture manufacturing apparatus including: a data designing unit that produces three-dimensional removable denture data for a removable denture to be manufactured, by producing three-dimensional denture base data of a denture base, and three-dimensional artificial teeth data including artificial teeth arranged on the denture base, and arrangement of the artificial teeth; a milling device that performs milling on a resin block obtained by arranging the artificial teeth in a frame body based on the artificial teeth data, and filling a base resin for forming the denture base into the frame body in which the artificial teeth are arranged; and a control unit that controls the milling device to mill, based on the removable denture data, the resin block, thereby milling the removable denture in which the artificial teeth are arranged on the denture base.

Hereinafter, an embodiment of the present aspect will be described in detail with reference to the drawings.

In the present embodiment, manufacturing of a removable denture will be described. In the embodiment, a removable denture suitable for a subject (patient) is manufactured by using a computer aided design (CAD) technology and a computer aided manufacturing (CAM) technology (CAD/CAM technology).

The removable denture according to the embodiment may be an upper jaw denture or a lower jaw denture. Further, the removable denture according to the embodiment may be a partial denture (incomplete denture) or a full denture (complete denture).

Figure 1:
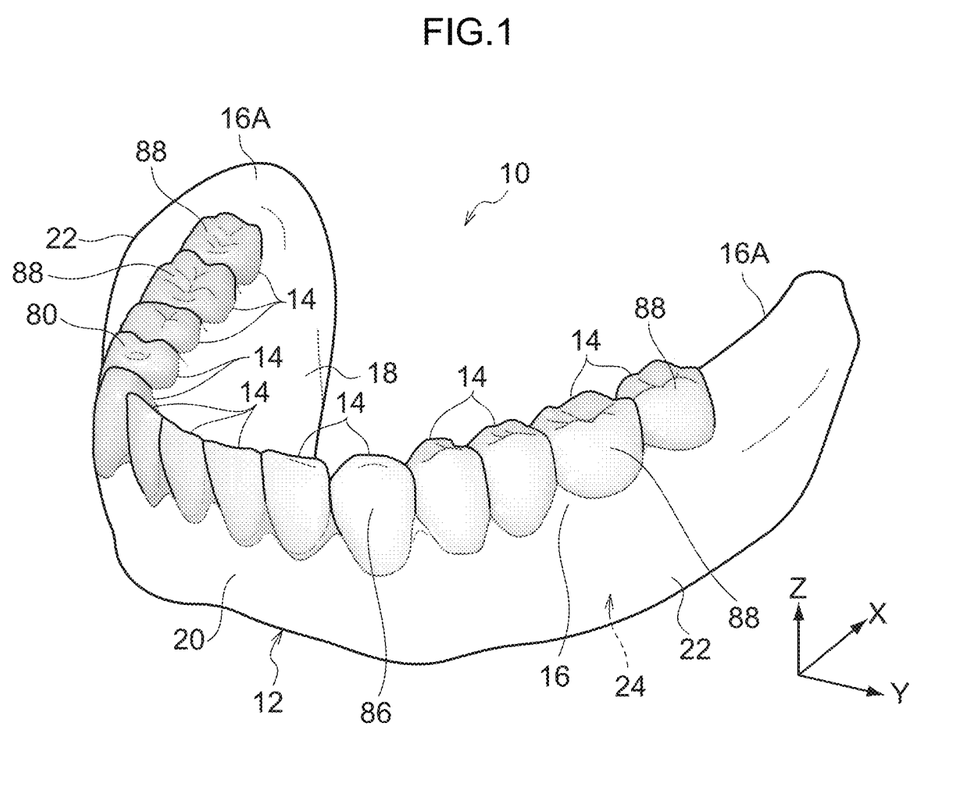
FIG. 1 is a perspective view of a removable denture according to the present embodiment.

FIG. 1 is a perspective view illustrating an appearance of a removable denture 10 as a lower jaw denture and a full denture according to the embodiment. In the drawing, a Z-axis direction corresponds to an upper side, an X-axis direction corresponds to a throat side in the oral cavity, and a Y-axis direction corresponds to a left buccal side in the oral cavity.

As illustrated in FIG. 1, the removable denture 10 includes a denture base 12 that is adjacent to the gingiva, and a plurality of artificial teeth 14 including back teeth 88 arranged on the denture base 12. The denture base 12 has a substantial chevron shape (substantial arc shape) in plan view, and the apex is adjacent to the lips in the oral cavity. Further, the denture base 12 has a substantially chevron-shaped vertical cross section (the cross-section is not illustrated), and the apex of the substantially chevron-shaped cross section is an alveolar portion 16. A throat-side portion of the gingiva on the lower jaw in the oral cavity is curved toward the upper jaw (upward), and throat-side alveolar portions 16A that cover the throat-side curved portions of the gingiva are formed in the alveolar portion 16 of the denture base 12.

In the denture base 12, a throat-side portion in the oral cavity is a lingual flange 18, and a labial-side portion in the oral cavity is a labial flange 20, and opposite buccal sides (opposite sides in a left-right direction) of the labial flange 20 are buccal flanges 22. In the denture base 12, each of the labial flange 20 and the buccal flanges 22 is integrated with the lingual flange 18 at the alveolar portion 16.

In the denture base 12, an inner surface between the labial flange 20 and the buccal flange 22, and the lingual flange 18 serves as an installing surface 24. In a case where the denture base 12 (removable denture 10) is installed in the oral cavity, the installing surface 24 is closely attached to the mucosa of the gingiva (gum) of the lower jaw.

The plurality of artificial teeth 14 are arranged so as to be substantially bilaterally symmetrical (substantially bilaterally symmetrical in plan view) from a labial side of the alveolar portion 16 toward each of throat sides (throat-side alveolar portions 16A) in the alveolar portion 16 of the denture base 12. Further, each of the artificial teeth 14 is in a state in which a base side portions 82 which is opposite to an occlusal surface 80 is at least partially embedded in the alveolar portion 16 and implanted.

Figure 2:
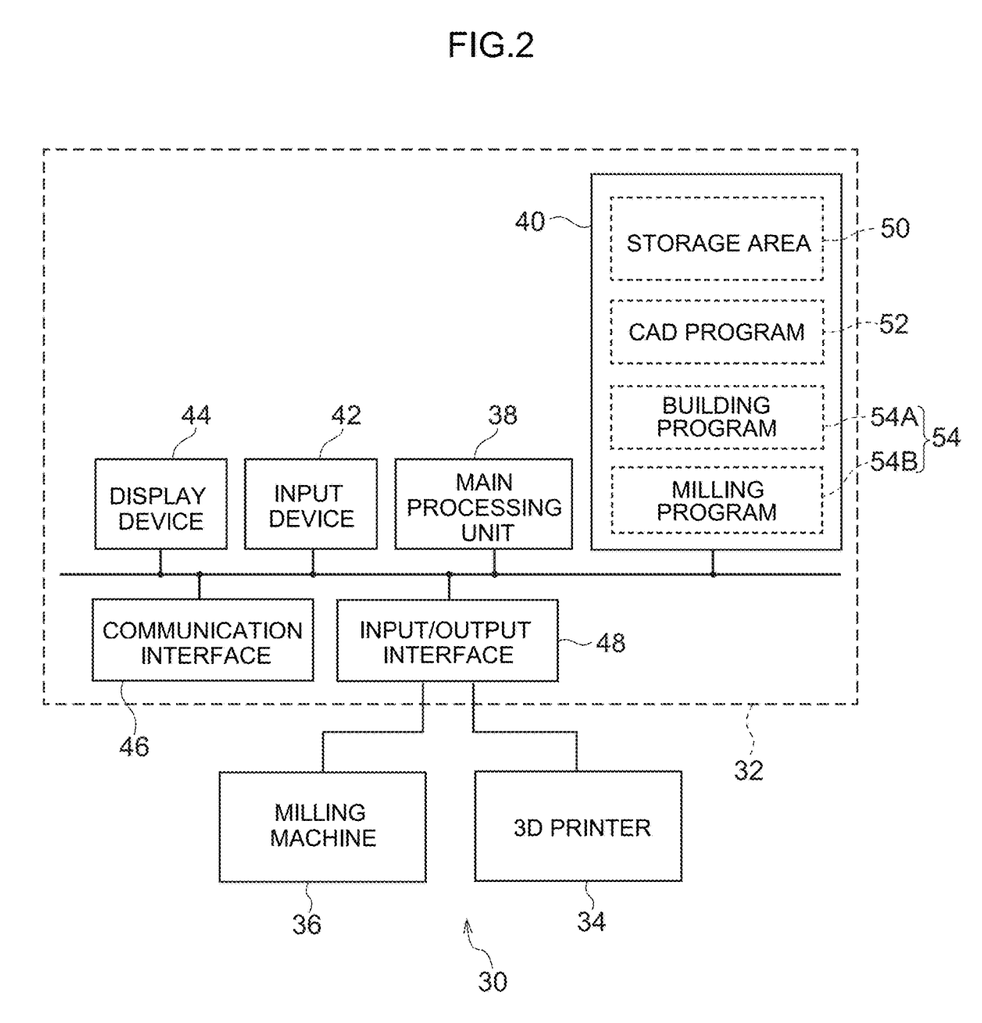
FIG. 2 is a block diagram illustrating a schematic configuration of a manufacturing system.

FIG. 2 illustrates a schematic configuration of a manufacturing system 30 using the CAD/CAM technology, as a manufacturing apparatus according to the present embodiment, and the manufacturing system 30 is used for manufacturing of the removable denture 10.

As illustrated in FIG. 2, the manufacturing system 30 is provided with a main processing device 32 including a control unit and a designing unit. Examples of the main processing device 32 include a personal computer. Further, the manufacturing system 30 is provided with a three-dimensional (3D) printer 34 as a building device (three-dimensional building device) and a milling machine 36 as a milling device.

The main processing device 32 includes a main processing unit 38 in which a central processing unit (CPU), a read only memory (ROM), a random access memory (RAM), and the like are connected by a bus (all are not illustrated). Further, the main processing device 32 includes a hard disk drive (HDD) 40 as a non-volatile storage medium, an input device 42 such as a keyboard or a mouse, a display device 44 such as a liquid crystal monitor (LCD), a communication interface 46, an input/output interface 48, and the like. In the main processing device 32, the main processing unit 38, the HDD 40, the input device 42, the display device 44, the communication interface 46, and the input/output interface 48 are connected to one another so that data can be exchanged.

The main processing device 32 is operated in a manner in which the CPU reads an operating system (OS) stored in the ROM in the main processing unit 38 and executes the OS while loading the OS in the RAM. Further, the HDD 40 is provided with a storage area 50 for storing various types of data and stores an application program. In the main processing unit 38, as the CPU reads the application program and executes the application program while loading the application program in the RAM, the application program works. The main processing device 32 is connected to a local area network (LAN) or a public communication line network (Internet) via the communication interface 46, such that it is possible to transmit/receive data, programs, or the like via the LAN or public communication line network. The main processing unit 38 may execute a program acquired via the communication interface 46.

Application programs stored in the HDD 40 include a CAD program (three-dimensional CAD software) 52 and a CAM program 54, and the CAM program 54 includes a building program 54A and a milling program 54B. The 3D printer 34 and the milling machine 36 are connected to the input/output interface 48 of the main processing device 32, and the 3D printer 34 and the milling machine 36 are controlled by the main processing unit 38.

As the CAD program 52 is read and executed in the main processing unit 38, the main processing device 32 functions as the designing unit that produces three-dimensional data. Further, as the building program 54A and the milling program 54B are read and executed in the main processing unit 38, the main processing device 32 functions as a building unit as a building process using the 3D printer 34, and a milling unit as a milling process using the milling machine 36. Further, the main processing unit 38 functions as the control unit in the building process and the milling process.

The manufacturing of the removable denture 10 in the manufacturing system 30 will be described below.

Figure 3:
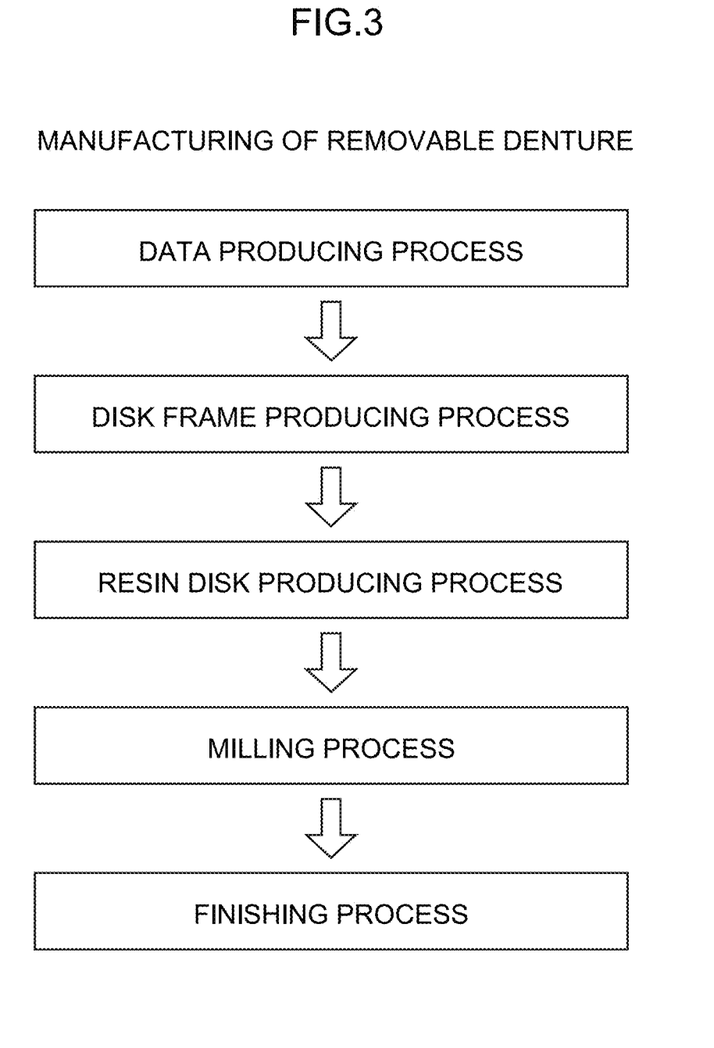
FIG. 3 is a flowchart of a process for manufacturing the removable denture.

In the manufacturing system 30, a disk frame 60 as a frame body is used for manufacturing of the removable denture 10. FIG. 3 is a flowchart illustrating a process for manufacturing the removable denture 10 using the manufacturing system 30, and FIG. 4 is a perspective view illustrating an appearance of the disk frame 60.

Figure 4:
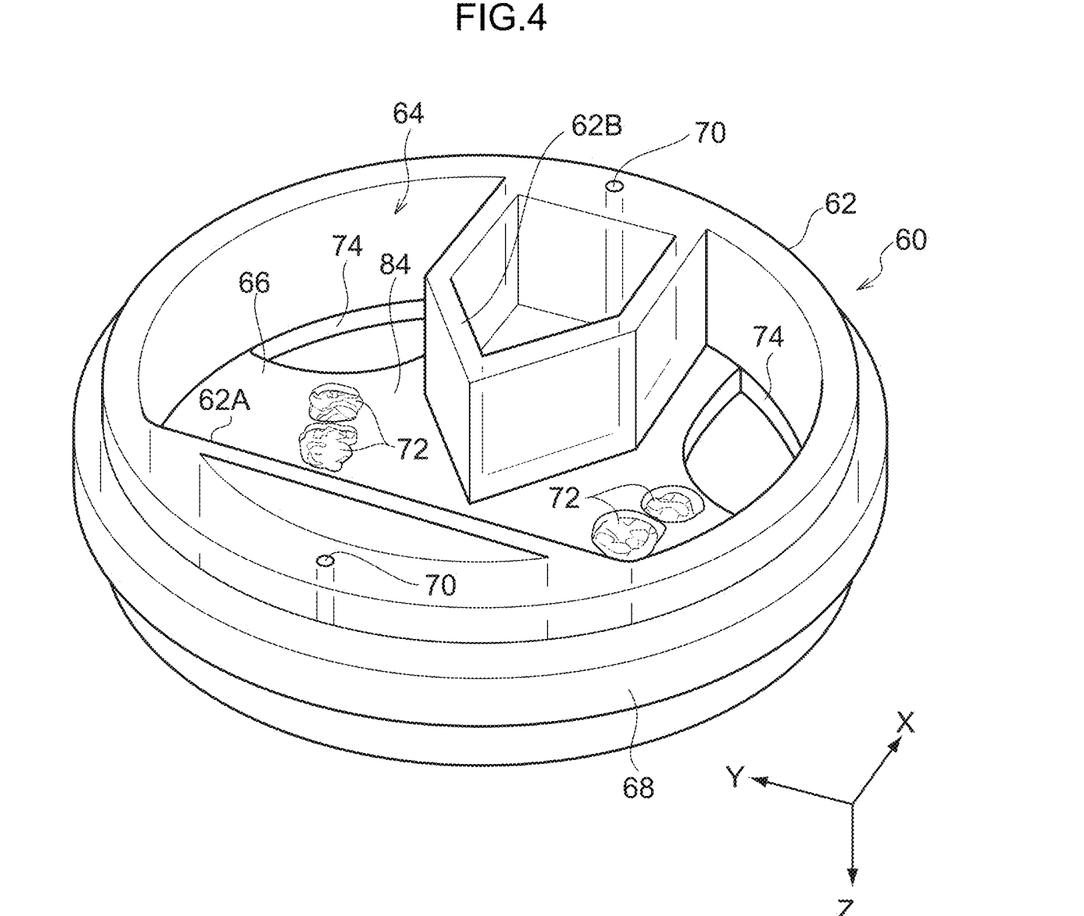
FIG. 4 is a perspective view illustrating a disk frame according to the embodiment.

As illustrated in FIG. 4, the disk frame 60 has a bottomed tubular shape, and the disk frame 60 includes a cylindrical frame portion 62. A resin filling portion 64 into which a base resin 76 for forming the denture base 12 is to be filled is formed in the frame portion 62. In the frame portion 62, a partition plate 62A and a substantially chevron-shaped (substantially pentagonal) partition portion 62B are provided, and a space surrounded by the frame portion 62, the partition plate 62A, and the partition portion 62B corresponds to the resin filling portion 64. A bottom plate 66 is formed in the resin filling portion 64 of the disk frame 60, and one side of the resin filling portion 64 in an axial direction of the disk frame 60 is closed by the bottom plate 66.

As illustrated in FIG. 3, in the embodiment, a data producing process as a data producing step, a disk frame producing process as a building step, a resin disk producing process as a block producing step, a milling process as a milling step, and a finishing process are sequentially performed to manufacture the removable denture 10.

[Data Producing Process]

Figure 5:
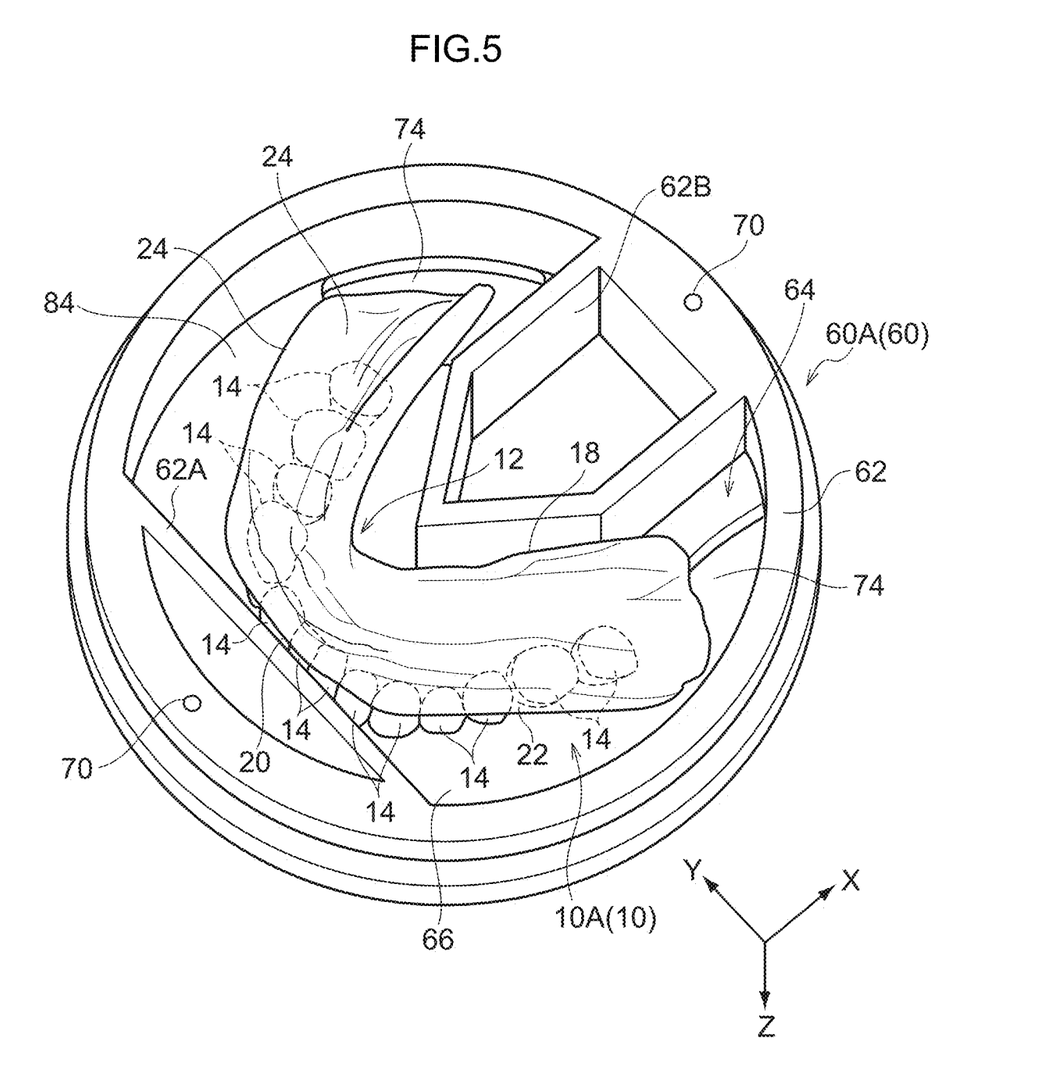
FIG. 5 is a three-dimensional image of the removable denture and the disk frame displayed on a display device.

The data producing process is also a designing process. In the data producing process, the CAD program 52 is started in the main processing device 32, and producing (designing) of removable denture data as three-dimensional data of the removable denture 10 to be manufactured, and disk frame data as three-dimensional data of the disk frame 60 is performed. FIG. 5 is a perspective view illustrating an example of an image displayed on the display device 44.

As illustrated in FIG. 5, in the data producing process, the input device 42 such as a keyboard or a mouse is operated so that a removable denture image 10A as a three-dimensional image of the removable denture 10 (the denture base 12 and the artificial teeth 14) to be manufactured, and a disk frame image 60A as a three-dimensional image of the disk frame 60 are displayed on the display device 44.

The CAD/CAM technology has been widely used in the field of dentistry, and various types of CAD application software that enable designing of a denture base, an artificial teeth, an artificial teeth array, and a removable denture in which an artificial teeth are arranged on the denture base, which are suitable for a subject, have been provided. As the CAD program 52, not only dedicated application software may be used, but also any of the provided CAD application software may be applied, and the removable denture 10 in which the artificial teeth 14 are arranged on the denture base 12 is designed so as to be suitable for a subject.

Further, in the field of dentistry, various prefabricated artificial teeth considering various mechanical properties such as durability, hardness, and shape, not to mention an aesthetics, have been provided. Artificial teeth can be formed using a tooth-colored resin, but it can be said that it is more efficient to use prefabricated artificial teeth with approved mechanical properties and an aesthetics than to form the artificial teeth using a tooth-colored resin. Therefore, it is preferable to use, as the artificial teeth 14, artificial teeth selected from prefabricated artificial teeth for the removable denture 10 to be manufactured, the selected artificial teeth having a color and shape suitable for a subject. As the three-dimensional data of the artificial teeth 14, a three-dimensional data of the selected prefabricated artificial teeth is used.

This makes it possible to easily obtain three-dimensional data for the removable denture 10 to be manufactured, in which the denture base 12, the artificial teeth 14, and the arrangement of the artificial teeth 14 are suitable for a subject. That is, three-dimensional removable denture data is produced based on three-dimensional denture base data of the denture base 12, and three-dimensional artificial teeth data including the artificial teeth 14 arranged on the denture base 12, and the arrangement of the artificial teeth 14.

The disk frame 60 is designed to match the removable denture 10 and the milling machine 36 used in the milling process, and disk frame data as three-dimensional data of the disk frame 60 is produced. As illustrated in FIG. 5, the disk frame data is produced so that a ring portion 68 as a positioning portion is added to the frame portion 62 in the disk frame image 60A. The ring portion 68 is used for positioning of the disk frame 60 with respect to the milling machine 36. The ring portion 68 is formed over the entire circumference of the frame portion 62 while protruding outward from an outer circumferential surface at an axially intermediate portion of the frame portion 62. Further, the position (for example, a central position in the axial direction) of the ring portion 68 in the axial direction of the frame portion 62, the width (dimension in the axial direction), and the protrusion height along a radial direction of the frame portion 62 are determined to match the milling machine 36. Note that the positioning portion of the disk frame 60 is formed to match the milling machine 36 used in the milling process, and is not necessarily limited to the ring portion 68.

Further, the disk frame data (disk frame image 60A) is produced so that holding holes 70 are added in pairs on opposite sides (in the embodiment, the labial side and the throat side in the removable denture image 10A) in a diameter direction of the frame portion 62. The pair of holding holes 70 are added so as to penetrate through the frame portion 62 in the axial direction. In the embodiment, the pair of holding holes 70 are added so that a line connecting axial centers of the pair of holding holes 70 in plan view is a line of symmetry of the resin filling portion 64. The holding holes 70 are also added to match the milling machine 36, and are not necessarily limited to the holding holes 70.

In a case of producing the removable denture data and the disk frame data, the removable denture image 10A and the disk frame image 60A are superimposed so that occlusal surfaces 80 of the artificial teeth 14 face the bottom plate 66 in the resin filling portion 64, and the denture base 12 and the arrangement of the artificial teeth 14 are distributed to the left and right with respect to the line connecting the axial centers of the pair of holding holes 70.

The disk frame data is produced so that the removable denture image 10A (the denture base 12 and the artificial teeth 14) is accommodated in the resin filling portion 64 in the disk frame image 60A. Further, in a case where the removable denture image 10A is superimposed on the disk frame image 60A, an occlusal surface 80 side portion of each of the artificial teeth 14 is arranged so as to be fitted into the bottom plate 66. In the disk frame data, portions of the bottom plate 66 that overlap with the respective artificial teeth 14 are removed to form concave fitting portions 72 as positioning portions for positioning the artificial teeth 14 in the disk frame 60. Further, in a case where the throat-side alveolar portion 16A of the denture base 12 interferes with the bottom plate 66 due to overlapping of the occlusal surface 80 side portions of the artificial teeth 14 on the bottom plate 66, recess portions 74 that prevent the bottom plate 66 from interfering with the throat-side alveolar portion 16A are formed in the bottom plate 66 in the disk frame data. That is, it is sufficient that the resin filling portion 64 has a minimum size necessary for accommodating the removable denture image 10A, and therefore, as illustrated in FIG. 4, in the embodiment, the partition plate 62A, the partition portion 62B, and the recess portions 74 are formed in the disk frame 60.

Therefore, in the data producing process, the removable denture data and the disk frame data are produced by determining relative positions of the removable denture data (removable denture image 10A) and the disk frame data (disk frame image 60A), the removable denture data including denture base data which is three-dimensional data of the denture base 12, and artificial teeth data which is three-dimensional data of the respective artificial teeth 14 (including the arrangement).

[Disk Frame Producing Process]

In the disk frame producing process, the building program 54A is started in the main processing device 32, and the 3D printer 34 builds the disk frame 60, serving as a signle member, based on the three-dimensional data of the disk frame 60.

In the disk frame producing process, a rapid prototyping method is applied to produce the disk frame 60 as a stereoscopic image. Examples of a building method in the rapid prototyping method include an additive manufacturing method, a stereolithography method, a powder shaping method, a fused deposition modeling method, and an inkjet method, in addition to a binder jetting method, a directed energy volume method, a material extraction method, a material jetting method, a powder bed fusion method, a sheet lamination method, and a vat photopolymerization method. In the disk frame producing process, any method may be applied.

In recent years, a three-dimensional building device (3D printer) for building a three-dimensional object by using a stereolithography method with a photocurable resin liquid (photocurable resin) as a building material has been widely used. In the embodiment, a 3D printer to which the stereolithography method is applied (for example, Form 2 (a trade name of a product of Formlabs)) is used.

In the stereolithography using the 3D printer 34, cross-section data (slice data) obtained by dividing the disk frame data at a layer pitch is used, and a photocurable resin liquid is photocured by irradiating light according to the cross-section data onto a platform (tray) in the photocurable resin liquid, as a result of which a cured layer is formed on a lower surface of the platform. Further, the light irradiation according to the cross-section data is repeated while moving (raising) the platform on which the cured layer is formed by the layer pitch, thereby layering the cured layer. As a result, the disk frame 60 is built based on the disk frame data in the 3D printer 34.

In the built disk frame 60, the ring portion 68 and the pair of holding holes 70 are formed on and in the frame portion 62, and the fitting portions 72 for the respective artificial teeth 14 and the recess portions 74 of the denture base 12 that correspond to the throat-side alveolar portions 16A are formed in the bottom plate 66 of the resin filling portion 64. Further, the partition plate 62A and the partition portion 62B are formed in the frame portion 62.

[Resin Disk Producing Process]

In the resin disk producing process, the artificial teeth 14 are arranged on the bottom plate 66 of the disk frame 60, and the liquid base resin 76 for forming the denture base 12 is casted into the resin filling portion 64 in which the artificial teeth 14 are arranged on the bottom plate 66 (resin filling process). In the resin disk producing process, the base resin 76 casted into the resin filling portion 64 is polymerized and cured (curing process).

Figure 6A:
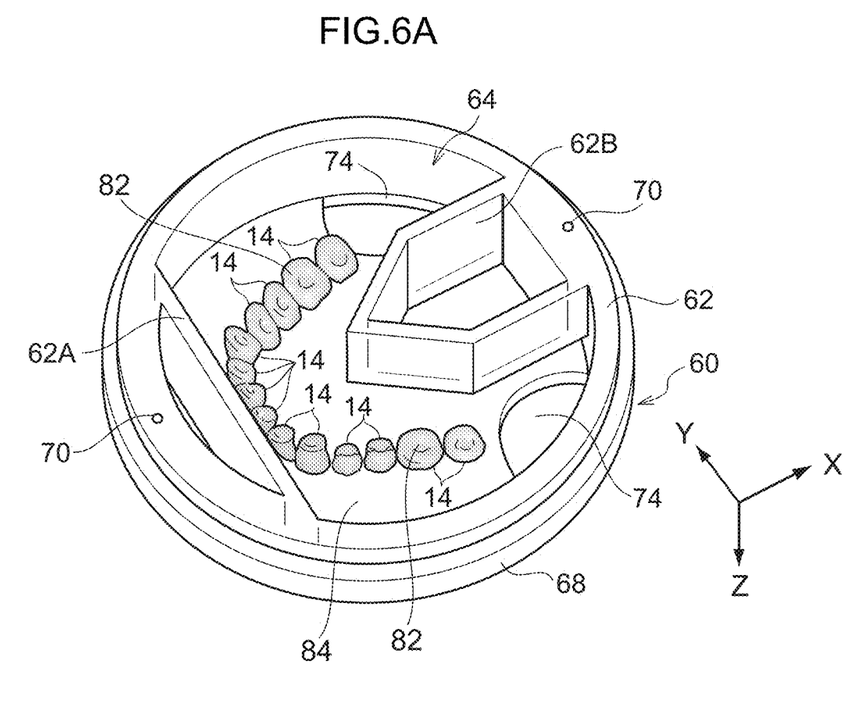
FIG. 6A is a perspective view illustrating the disk frame in which artificial teeth are arranged.

FIG. 6A is a perspective view illustrating the disk frame 60 in which the artificial teeth 14 are arranged. Further, FIG. 6B is a perspective view illustrating the disk frame 60 during the filling of the base resin 76, and FIG. 6C is a perspective view illustrating the disk frame 60 (corresponding to a resin disk 78 to be described below) filled with the base resin 76.

As the artificial teeth 14 arranged in the disk frame 60, artificial teeth (prefabricated artificial teeth) applied (selected) in the data producing process are used. Therefore, the artificial teeth 14 have an approved aesthetics, similarly to the case of the full denture according to the related art which does not use the CAD/CAM technology. The fitting portion 72 having a recess corresponding to the occlusal surface 80 side portion of each of the artificial teeth 14 is formed in the bottom plate 66 of the disk frame 60.

As illustrated in FIG. 6A, the occlusal surface 80 side portion of each of the artificial teeth 14 is fitted into the fitting portion 72 and the respective artificial teeth 14 are arranged on the bottom plate 66. In a case of arranging the artificial teeth 14, an adhesive is applied to an inner surface of each fitting portion 72 of the bottom plate 66 to bond each of the artificial teeth 14 to the bottom plate 66. As a result, the artificial teeth 14 are positioned on the bottom plate 66 and joined to the bottom plate 66 (disk frame 60), such that the artificial teeth 14 are arranged on the bottom plate 66 according to the artificial teeth data and temporarily fixed. Note that the fitting portion 72 does not have to be concave as long as the artificial teeth 14 can be arranged based on the artificial teeth data. The artificial teeth 14 may be positioned without the fitting portion 72, may be simply fitted into the fitting portion 72 without using an adhesive or the like, or may be temporarily fixed to the fitting portion 72 with an adhesive or the like.

Figure 6B:
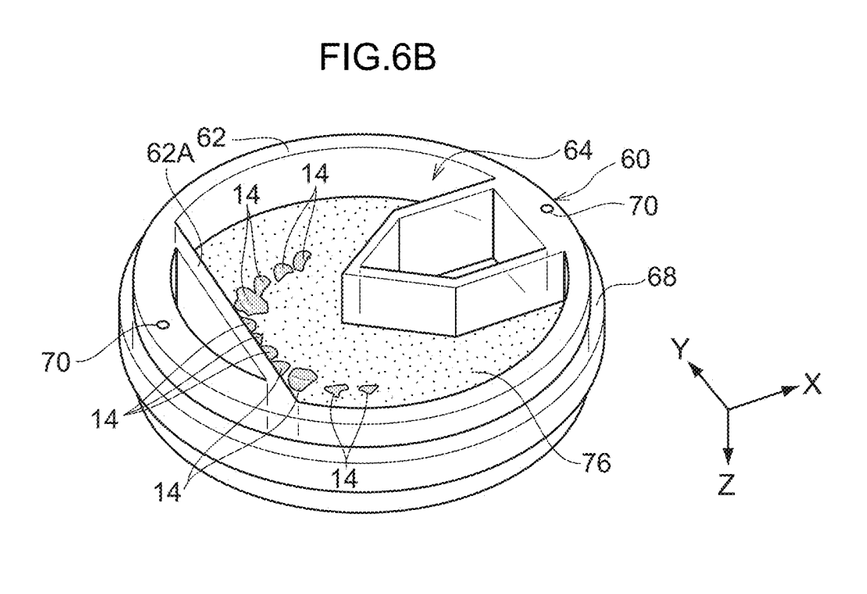
FIG. 6B is a perspective view illustrating the disk frame partially filled with a base resin.
Figure 6C:
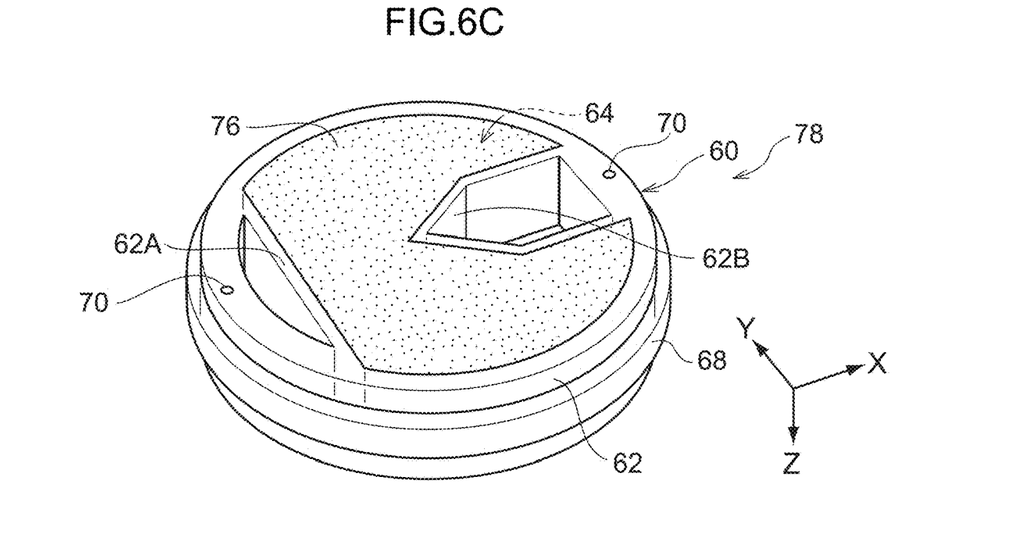
FIG. 6C is a perspective view illustrating the disk frame filled with the base resin.

Next, as illustrated in FIG. 6B, the liquid base resin 76 is casted into the resin filling portion 64 of the disk frame 60.

In the field of dentistry, various base resins (resin materials) for forming the denture base 12 have been provided. As the base resin 76, a resin that is curable by polymerization is used. As the base resin 76, a resin having a low absorbency, an excellent dimensional stability, an excellent impact resistance in a wide temperature range, an excellent abrasion resistance, and self-lubricating property, and having various properties as a denture base such as an excellent chemical resistance, a small specific gravity, an excellent weather resistance, and an excellent biocompatibility is applied. In addition, as the base resin 76, a resin that can give a color suitable for a subject is applied. In the embodiment, a room-temperature polymerization resin (for example, Fit Resin (a trade name of a product of SHOFU INC.) is used as the base resin 76. Note that the base resin 76 is not limited to the room-temperature polymerization resin, and other types of resins such as a heat polymerization resin, a pressure polymerization resin, and a photopolymerization resin can be used, and the base resin 76 is not limited to a cast resin.

Here, each of the artificial teeth 14 is positioned on the bottom plate 66 and temporarily fixed. Therefore, it is possible to prevent the artificial teeth 14 from coming off the bottom plate 66 and to prevent the inclination of the artificial teeth 14 with respect to the bottom plate 66 from changing in a case where the liquid base resin 76 is casted into the resin filling portion 64, and thus each of the artificial teeth 14 can be kept positioned with respect to the disk frame 60.

Next, the base resin 76 casted into the resin filling portion 64 is polymerized and cured. The polymerization is performed while accelerating the polymerization by arranging the disk frame 60 in which the resin filling portion 64 is filled with the liquid base resin 76 in a predetermined heat polymerization environment (for example, at 0.2 MPa and 50° C.) for a predetermined time (for example, 30 min).

In this way, the resin disk 78, serving as a resin block, illustrated in FIG. 6C is manufactured. The resin disk 78 is a so-called customized disk in which the artificial teeth 14 having a shape and arrangement suitable for a subject are embedded in the base resin 76. In this resin disk 78, the ring portion 68 and the pair of holding holes 70 are formed on and in the frame portion 62 forming an outer circumferential portion.

[Milling Process]

Figure 7:
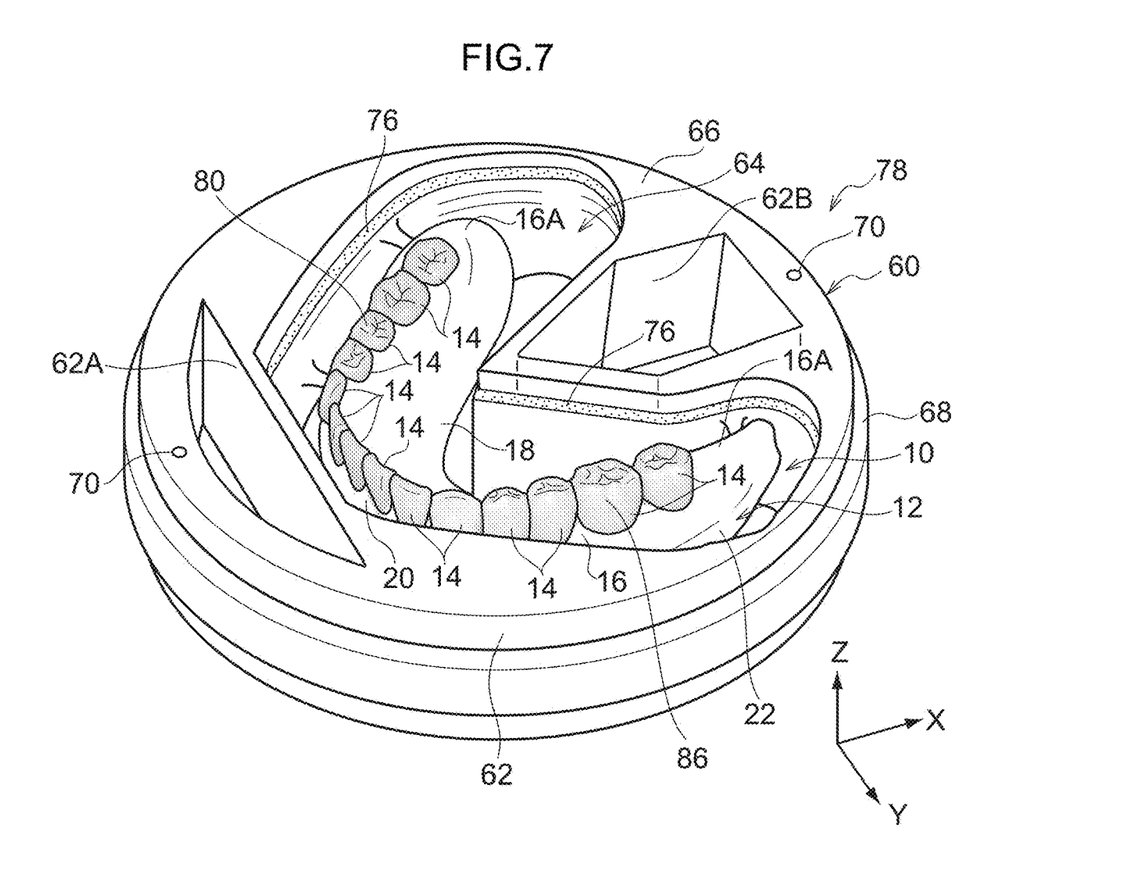
FIG. 7 is a perspective view illustrating a mill resin disk.

In the milling process, milling of the resin disk 78 is performed using the denture base data (or the denture base data may be used). FIG. 7 is a perspective view illustrating the resin disk 78 mill in the milling process.

In the milling process, as the milling machine 36, a milling device (for example, DWX52D (a product name of a product of DGSHAPA Corporation)) in which a holder can perform, with respect to a milling tool, a simultaneous control and numerical control along an X axis, a Y axis, a Z axis, and five axes around two of the X axis, the Y axis, and the Z axis is used. For example, the ring portion 68 of the resin disk 78 is fitted into an annular (ring-shaped) holder of the milling machine 36, and a positioning pin of the milling machine 36 is inserted into each of the pair of holding holes 70. As a result, the resin disk 78 is positioned in, held in, and fixed to the milling machine 36 (the installation state is not illustrated).

Further, in the milling process, the milling program 54B is started in the main processing device 32, the removable denture data is read, and the main processing device 32 controls the milling machine 36 to mill the resin disk 78 based on the removable denture data.

As a result, as illustrated in FIG. 7, in the resin disk 78, the base resin 76 in the resin filling portion 64 is milled in accordance with the removable denture data, and the denture base 12 is milled from the base resin 76.

Here, in the resin disk 78, the artificial teeth 14 are arranged on the bottom plate 66 of the disk frame 60 and embedded in the base resin 76. The denture base 12 is milled and the base resin 76 covering the artificial teeth 14 is removed from the surfaces 86 of the artificial teeth 14 by milling the resin disk 78 (the bottom plate 66 of the disk frame 60 and the base resin 76) based on the three-dimensional data of the removable denture 10. The surfaces 86 of the artificial teeth 14 are also milled. As a result, the removable denture 10 in which the denture base 12 and the artificial teeth 14 are integrated is milled from the resin disk 78.

[Finishing Process]

In the finishing step, the removable denture 10 is removed from the remaining resin disk 78, and the denture base 12, each of the artificial teeth 14 are subjected to surface-finish, and adjustment to match a subject or the like is performed. By doing so, the removable denture 10 (see FIG. 1) suitable for a subject can be obtained.

Note that, in the milling step, milling is performed so that the denture base 12 is milled using the three-dimensional data of the removable denture 10, the base resin 76 attached to the artificial teeth 14 is removed, and the surface 86 of the artificial teeth 14 is polished. Therefore, even in a case where the arrangement of the artificial teeth 14 does not completely match the three-dimensional data (removable denture data) of the removable denture 10 to be manufactured due to a slight positional deviation or the like caused by the fitting of the artificial teeth 14 into the bottom plate 66 of the disk frame 60, the removable denture 10 can be finished according to the three-dimensional data, and restoration accuracy of the artificial teeth 14 can be improved. However, the artificial teeth 14 arranged according to the three-dimensional data of the removable denture 10 do not have to be milled.

As such, in the embodiment, in a case of manufacturing the removable denture 10 in which the artificial teeth 14 are arranged on the denture base 12, the removable denture data of the removable denture 10 is produced, the removable denture data including the denture base data of the denture base 12 and the artificial teeth data of the artificial teeth 14 arranged on the denture base 12. Next, the liquid base resin 76 is casted into the resin filling portion 64 of the disk frame 60 in which the occlusal surfaces 80 of the artificial teeth 14 face the bottom plate 66 and the artificial teeth 14 are arranged on the bottom plate 66 based on the artificial teeth data, polymerized, and cured, thereby producing the resin disk 78 in which the artificial teeth 14 are embedded in the base resin 76. From the produced resin disk 78, the denture base 12 is milled by milling the base resin 76 based on the removable denture data, thereby manufacturing the removable denture 10 in which the base side portions 82 of the artificial teeth 14 is embedded in the denture base 12.

Here, in the resin disk 78, the artificial teeth 14 are bonded to the bottom plate 66 of the disk frame 60, and the base side of the artificial teeth 14 is superposed on the base resin 76 to firmly join the artificial teeth 14 to the base resin 76. As a result, the artificial teeth 14 are firmly joined to the denture base 12. Therefore, in the removable denture 10, the artificial teeth 14 are prevented from coming off or having a gap from the denture base 12. Further, in the removable denture 10, since the denture base 12 is milled from the base resin 76 in a state where the artificial teeth 14 are embedded, the restoration accuracy of the artificial teeth 14 can be improved. Note that joining between the artificial teeth 14 and the denture base 12 is not limited to chemical joining, and may be physical joining such as fitting of the base side of the artificial teeth 14 to the base resin 76.

Further, in a case where the artificial teeth and the denture base are manufactured separately, and the artificial teeth are fitted into the denture base, it is difficult to fit the artificial teeth into the denture base when the base side portions 82 of the artificial teeth has undercuts. On the other hand, as the liquid base resin 76 is casted into the resin filling portion 64 in which the artificial teeth 14 are arranged, the undercut portions of the artificial teeth 14 can be appropriately embedded in the base resin 76, and thus the artificial teeth 14 can be joined firmly (without a gap) to the denture base 12.

In addition, in the removable denture 10, the artificial teeth 14 are positioned and arranged with respect to the disk frame 60 based on the artificial teeth data. Therefore, the positional deviation of the artificial teeth 14 with respect to the denture base 12 can be suppressed, and thus the removable denture 10 can be manufactured with high accuracy.

The fitting portions 72 are formed in the bottom plate 66 of the disk frame 60, and the occlusal surface 80 side portions of the artificial teeth 14 are fitted into the fitting portions 72, respectively. As a result, the artificial teeth 14 can be easily and accurately positioned with respect to the disk frame 60, and the positional deviation of the artificial teeth 14 can be prevented, such that the restoration accuracy of the artificial teeth 14 can be improved. Moreover, the recess portions 74 corresponding to the throat-side alveolar portions 16A of the denture base 12 are formed in the bottom plate 66 of the disk frame 60. Therefore, since the occlusal surfaces 80 of the artificial teeth 14 are fitted into the fitting portions 72, respectively, it is possible to prevent the base resin 76 for the throat-side alveolar portion 16A from being insufficient and thus causing the throat-side alveolar portion 16A to be uncuttable to an appropriate shape, such that it is possible to manufacture the removable denture 10 having an appropriate shape without a crack or the like.

Furthermore, since the ring portion 68 and the pair of holding holes 70 are formed in the disk frame 60, the resin disk 78 produced using the disk frame 60 can be accurately positioned in the milling machine 36. Therefore, the artificial teeth 14 can be accurately positioned with respect to the milling machine 36, and it is possible to effectively prevent the positional deviation of the artificial teeth 14 with respect to the denture base 12.

In the data producing process, the removable denture data and the disk frame data are produced by superimposing the removable denture 10 on the disk frame 60, and the disk frame 60 is built using the produced disk frame data. Therefore, it is possible to manufacture the disk frame 60 that matches the size of the removable denture 10.

Further, the partition plate 62A and the partition portion 62B are provided in the disk frame 60, and the recess portions 74 are formed in the bottom plate 66, such that the resin filling portion 64 having a minimum capacity necessary for filling of an amount of resin that enables milling of the denture base 12 is formed. Therefore, the volume of the base resin 76 in manufacturing the resin disk 78 can be suppressed, and the cost can be reduced. Moreover, since the disk frame 60 is built using the stereolithography method, it is possible to easily manufacture the removable denture 10 suitable for a subject and to suppress the manufacturing cost.

Further, in a case of producing the removable denture data and the disk frame data, the occlusal surface 80 side portions of the artificial teeth 14 of the removable denture image 10A are overlapped with the bottom plate 66 of the disk frame image 60A. Therefore, the artificial teeth 14 can be properly positioned and arranged on the bottom plate 66 of the disk frame 60. Moreover, the positioning of the artificial teeth 14 with respect to the disk frame 60 can be facilitated.

Note that, in the embodiment described above, the substantially cylindrical disk frame 60 is used, but the frame body is not limited to have the bottomed cylindrical shape, and it is sufficient that the artificial teeth 14 can be arranged inside the frame body and the base resin 76 can be filled into the frame body. Further, the height of the frame body may be any height as long as the denture base 12 can be formed using the filled base resin 76. The shape of the frame body is not limited to a circular shape in plan view, and may be a polygonal shape such as a triangle or a quadrangle, or a semicircular shape. As the shape of the frame body in plan view is a polygonal shape or semicircular shape, a corner portion can be used for positioning with respect to the milling device, and thus a positioning hole such as the holding hole 70 can be omitted.

Further, in the embodiment, the base resin 76 is filled up to the upper end of the disk frame 60 as illustrated in FIG. 6C. However, the milling may be performed in a state in which the base resin 76 is filled to the extent that the denture base 12 can be formed (for example, slightly more than in FIG. 6B).

Further, in the embodiment, the fitting portions 72 into which the occlusal surface 80 side portions of the artificial teeth 14 are fitted, respectively, are formed in the bottom plate 66 of the disk frame 60. However, fitting portions into which the base side portion 82 opposite to the occlusal surfaces 80 of the artificial teeth is fitted, may be formed in the frame body. As the fitting portions into which the base side portion 82 of the artificial teeth is fitted, respectively, are formed in the frame body, and the base side portions 82 of the artificial teeth is fitted into the fitting portions, the base side portions 82 of the artificial teeth can be positioned and arranged in the frame body.

In this case, the resin used for producing the frame body is not limited, but it is preferable to use, for the frame, the same resin as the base resin. In addition, protrusion portions corresponding to the arrangement of the artificial teeth may be formed in the frame body, and fitting portions may be formed in the protrusion portions, respectively. Thereby, the frame body can be used as a part of the denture base.

Further, in a case where the artificial teeth are arranged in the frame body, it is preferable that the base side of the artificial teeth be firmly fixed to the frame body by using fixing means such as an adhesive. In a case of producing a resin block using the frame body to which the base side of the artificial teeth is fixed, it is sufficient that the base resin is filled to the extent that the base side of the artificial teeth is embedded in the denture base in the removable denture as illustrated in FIG. 6B, and thus the amount of base resin to fill the frame body can be reduced.

Therefore, even in a case of positioning the base side of the artificial teeth in the frame body, it is possible to produce the resin block that is a so-called customized disk in which the artificial teeth 14 having a shape and arrangement suitable for a subject are embedded in the base resin 76. The resin block produced in this way is milled based on the removable denture data by using the milling device such as the milling machine 36, thereby manufacturing the removable denture based on the removable denture data. In this case, the removable denture is milled in a direction different from that in FIG. 7 (upside down) with respect to the frame body.

In the removable denture manufactured as described above, a part of the frame body is used as the denture base, and the base side portions 82 of the artificial teeth is embedded in the base resin. Therefore, the artificial teeth and the denture base can be more firmly joined to each other. Further, artificial teeth having an excellent aesthetics can be used for the removable denture. Since the removable denture is milled by milling the resin block based on the removable denture data, it is possible to manufacture the removable denture with a favorable restoration accuracy of the artificial teeth.

Furthermore, in the embodiment, the three-dimensional removable denture data of the removable denture 10 including the denture base data and the artificial teeth data is produced in the main processing device 32 of the manufacturing system 30, but the removable denture data of the removable denture 10 to be manufactured may also be produced by another CAD device different from the main processing device 32. In this case, the manufacturing system 30 only has to function so that a data producing step includes a data acquisition step. Further, in the manufacturing system 30, the main processing device 32 only has to acquire the removable denture data produced by another CAD device via a network line or a mobile (or portable) storage medium (such as a USB memory) to manufacture the removable denture 10 using the acquired removable denture data.

Further, in the embodiment, the removable denture 10 as a lower jaw denture and a full denture has been described as an example, but the removable denture is not limited thereto, and the removable denture may be a partial denture. Further, the removable denture is not limited to a lower jaw denture, and may be an upper jaw denture.

The disclosure of Japanese Patent Application No. 2018-065256 is incorporated herein by reference in its entirety.

All documents, patent applications, and technical standards mentioned herein are incorporated herein by reference to the extent that it is specifically and individually stated that the individual document, patent application, and technical standard are incorporated by reference.

What is claimed is:

1. A method of manufacturing a removable denture, comprising:
producing three-dimensional removable denture data for a removable denture to be manufactured, by producing three-dimensional denture base data of a denture base, and three-dimensional artificial teeth data including artificial teeth arranged on the denture base, and an arrangement of the artificial teeth;
building a bottomed frame body into which a base resin for forming the denture base, which is based on the denture base data, is filled, by using a rapid prototyping method;
producing a resin block by casting the base resin into the frame body for covering base side portions of the artificial teeth that are opposite to occlusal surfaces of the artificial teeth for fully embedding the artificial teeth in the base resin, wherein the artificial teeth, which have been produced in advance, are arranged on a bottom portion of the built frame body based on the artificial teeth data; and
milling the base resin of the resin block based on the removable denture data to create the denture base and manufacture the removable denture in which the base side portions of the artificial teeth are embedded in the denture base, by milling the frame body and the base resin of the resin block from both the bottom portion of the frame body and a side opposite to the bottom portion using a milling device, and by removing the base resin attached to surfaces of the artificial teeth other than the base side portions of the artificial teeth.

2. The method of manufacturing a removable denture according to claim 1, wherein the artificial teeth are positioned with respect to the frame body based on the artificial teeth data and are arranged on a bottom plate in the frame body.

3. The method of manufacturing a removable denture according to claim 1, wherein fitting portions, into which base side portions of the artificial teeth that are opposite to occlusal surface side portions or occlusal surfaces of the artificial teeth are fitted in a case in which the artificial teeth are arranged based on the artificial teeth data, are provided in the bottom plate in the frame body.

4. The method of manufacturing a removable denture according to claim 1, wherein, in the building, a positioning portion by which the artificial teeth arranged in the frame body are positioned with respect to the milling device is built on the frame body.

5. The method of manufacturing a removable denture according to claim 1, wherein, in the building, the frame body is built based on three-dimensional frame body data of the frame body that is produced according to the removable denture data.

6. The method of manufacturing a removable denture according to claim 5, wherein the frame body data is produced by determining relative positions so that a three-dimensional removable denture image represented by the removable denture data is accommodated in a three-dimensional frame body image represented by the frame body data.

7. The method of manufacturing a removable denture according to claim 6, further comprising producing the frame body data by excluding an overlapping portion from a bottom plate of the frame body image owing to a base part side at an opposite side from occlusal surface side portions or occlusal surfaces of the artificial teeth shown in the removable denture image overlapping with the bottom plate of the frame body shown in the frame body image.

8. The method of manufacturing a removable denture according to claim 1, wherein the base resin is cast into the frame body for fully embedding the artificial teeth therein by forming a smooth surface plane of the base resin above the artificial teeth.

9. A method of manufacturing a removable denture, comprising:
producing three-dimensional removable denture data for a removable denture to be manufactured, by producing three-dimensional denture base data of a denture base, and three-dimensional artificial teeth data including artificial teeth arranged on the denture base, and an arrangement of the artificial teeth;
building a bottomed frame body into which a base resin for forming the denture base, which is based on the denture base data, is filled, by using a rapid prototyping method;
producing a resin block by casting the base resin into the frame body for covering base side portions of the artificial teeth that are opposite to occlusal surfaces of the artificial teeth for fully embedding the artificial teeth in the base resin, wherein the artificial teeth, which have been produced in advance, are arranged on a bottom portion of the built frame body based on the artificial teeth data; and
milling the base resin of the resin block based on the removable denture data to create the denture base and manufacture the removable denture in which the base side portions of the artificial teeth are embedded in the denture base, by milling the frame body and the base resin of the resin block from both the bottom portion of the frame body and a side opposite to the bottom portion using a milling device, and by removing the base resin attached to surfaces of the artificial teeth other than the base side portions of the artificial teeth,
wherein, in the milling, the removable denture in which the artificial teeth are arranged on the denture base according to the removable denture data is milled by milling surfaces of the artificial teeth based on the artificial teeth data in a case in which the arrangement of the artificial teeth embedded in the base resin does not match the artificial teeth data.

* * * * *

UNITED STATES PATENT AND TRADEMARK OFFICE
CERTIFICATE OF CORRECTION

PATENT NO. : 12,004,915 B2
APPLICATION NO. : 17/043048
DATED : June 11, 2024
INVENTOR(S) : Manabu Kanazawa et al.

It is certified that error appears in the above-identified patent and that said Letters Patent is hereby corrected as shown below:

On the Title Page

In item (72) Inventors:
"Manabu Kanazawa, Toyko (JP); Yumika Soeda, Toyko (JP); Maiko Iwaki, Toyko (JP); Toshio Arakida, Toyko (JP); Tamaki Hada, Toyko (JP); Shunsuke Minakuchi, Toyko (JP)"

Should be changed to:
-- Manabu Kanazawa, Tokyo (JP); Yumika Soeda, Tokyo (JP); Maiko Iwaki, Tokyo (JP); Toshio Arakida, Tokyo (JP); Tamaki Hada, Tokyo (JP); Shunsuke Minakuchi, Tokyo (JP) --

Signed and Sealed this
Eighth Day of October, 2024

Katherine Kelly Vidal
*Director of the United States Patent and Trademark Office*